US010740710B2

(12) United States Patent
Bonomi et al.

(10) Patent No.: US 10,740,710 B2
(45) Date of Patent: Aug. 11, 2020

(54) FOG COMPUTING FACILITATED FLEXIBLE FACTORY

(71) Applicant: Nebbiolo Technologies, Inc., Milpitas, CA (US)

(72) Inventors: Flavio Bonomi, Palo Alto, CA (US); Chandra Shekhar Joshi, Saratoga, CA (US); Kannan Devarajan, Cupertino, CA (US); Pankaj Bhagra, Fremont, CA (US); Palani Chinnakannan, San Jose, CA (US)

(73) Assignee: NEBBIOLO TECHNOLOGIES, INC. CA (US)

( * ) Notice: Subject to any disclaimer, the term of this patent is extended or adjusted under 35 U.S.C. 154(b) by 179 days.

(21) Appl. No.: 15/468,004

(22) Filed: Mar. 23, 2017

(65) Prior Publication Data

US 2017/0277173 A1 Sep. 28, 2017

Related U.S. Application Data (60) Provisional application No. 62/313,640, filed on Mar. 25, 2016.

(51) Int. Cl.
*H04L 29/06* (2006.01)
*G06Q 10/06* (2012.01)
(Continued)

(52) U.S. Cl.
CPC . *G06Q 10/06315* (2013.01); *G05B 19/41845* (2013.01); *G05B 19/41865* (2013.01);
(Continued)

(58) Field of Classification Search
CPC ....................................... H04L 67/10
See application file for complete search history.

(56) References Cited

U.S. PATENT DOCUMENTS

| 5,630,053 A | 5/1997 | Morikawa |
| 6,370,656 B1 | 4/2002 | Olarig |

(Continued)

FOREIGN PATENT DOCUMENTS

| EP | 2800303 A1 | 11/2014 |
| EP | 3437256 A1 | 2/2019 |

(Continued)

OTHER PUBLICATIONS

"International Search Report and Written Opinion," Patent Cooperation Treaty Application No. PCT/US2017/023898, dated Jun. 19, 2017, 16 pages.

(Continued)

*Primary Examiner* — Adnan M Mirza
(74) *Attorney, Agent, or Firm* — Barry Choobin; Patent 360 LLC (57) ABSTRACT

Provided herein are exemplary systems and methods for a fog computing facilitated flexible factory including establishing a physical production process as part of a work cell, establishing a sensing process as part of the work cell for the physical production process, establishing a monitoring process for the sensing process and the physical production process, establishing a managing process for the monitoring process, the sensing process and the physical production process, establishing a planning process for the managing process, the monitoring process, the sensing process and the physical production process, and establishing a fog node as part of the work cell for all of the processes.

15 Claims, 5 Drawing Sheets

(51) Int. Cl.
*H04L 29/08* (2006.01)
*G06Q 50/04* (2012.01)
*G05B 19/418* (2006.01)
*H04W 4/80* (2018.01)

(52) U.S. Cl.
CPC .............. *G06Q 50/04* (2013.01); *H04L 67/10* (2013.01); *G05B 2219/31073* (2013.01); *G05B 2219/32085* (2013.01); *H04W 4/80* (2018.02); *Y02P 90/20* (2015.11); *Y02P 90/24* (2015.11); *Y02P 90/86* (2015.11)

(56) References Cited

U.S. PATENT DOCUMENTS

| | | |
|---|---|---|
| 6,763,479 B1 | 7/2004 | Hebert |
| 8,190,084 B1 | 5/2012 | Gunasekara |
| 9,294,443 B2 | 3/2016 | Johnson et al. |
| 9,842,013 B2 | 12/2017 | Arjun et al. |
| 10,044,524 B1 | 8/2018 | Edelhaus et al. |
| 10,419,394 B2 | 9/2019 | Chou et al. |
| 2002/0156888 A1 | 10/2002 | Lee et al. |
| 2003/0131177 A1 | 7/2003 | Ng |
| 2004/0128370 A1 | 7/2004 | Kortright |
| 2004/0205388 A1 | 10/2004 | Nakano |
| 2005/0232285 A1 | 10/2005 | Terrell et al. |
| 2006/0206602 A1 | 9/2006 | Hunter et al. |
| 2007/0103476 A1 | 5/2007 | Huang et al. |
| 2008/0240163 A1 | 10/2008 | Ibrahim et al. |
| 2008/0250042 A1 | 10/2008 | Mopur et al. |
| 2009/0070617 A1 | 3/2009 | Arimilli et al. |
| 2010/0082811 A1 | 4/2010 | Van Der Merwe et al. |
| 2010/0290473 A1 | 11/2010 | Enduri et al. |
| 2011/0103259 A1 | 5/2011 | Aybay et al. |
| 2012/0026898 A1 | 2/2012 | Sen et al. |
| 2012/0096205 A1 | 4/2012 | Velayudhan et al. |
| 2012/0304262 A1 | 11/2012 | Cucco et al. |
| 2012/0324442 A1 | 12/2012 | Barde |
| 2013/0104236 A1 | 4/2013 | Ray et al. |
| 2013/0237268 A1 | 9/2013 | Teng et al. |
| 2014/0006594 A1 | 1/2014 | Gabriel |
| 2014/0032173 A1 | 1/2014 | Kida et al. |
| 2014/0086254 A1 | 3/2014 | Hardie |
| 2014/0136952 A1 | 5/2014 | Zhu et al. |
| 2014/0228978 A1 | 8/2014 | Neubert et al. |
| 2014/0258491 A1 | 9/2014 | Forristal et al. |
| 2014/0330925 A1 | 11/2014 | Lee et al. |
| 2014/0380488 A1 | 12/2014 | Datta Ray et al. |
| 2015/0006733 A1 | 1/2015 | Khan et al. |
| 2015/0043382 A1 | 2/2015 | Arora et al. |
| 2015/0063369 A1 | 3/2015 | Lida et al. |
| 2015/0094868 A1 | 4/2015 | Diab et al. |
| 2015/0153175 A1 | 6/2015 | Skaaksrud |
| 2015/0249586 A1 | 9/2015 | Byers et al. |
| 2015/0256611 A1 | 9/2015 | Cohn et al. |
| 2015/0271642 A1 | 9/2015 | Raymond et al. |
| 2015/0317835 A1 | 11/2015 | Byers |
| 2016/0036707 A1 | 2/2016 | Mestery et al. |
| 2016/0124819 A1 | 5/2016 | Killadi et al. |
| 2016/0162299 A1 | 6/2016 | Ali et al. |
| 2016/0182458 A1 | 6/2016 | Shatzkamer et al. |
| 2016/0182639 A1 | 6/2016 | Hong et al. |
| 2016/0210209 A1 | 7/2016 | Verkaik et al. |
| 2016/0224081 A1 | 8/2016 | Worthington et al. |
| 2016/0224277 A1 | 8/2016 | Batra et al. |
| 2016/0308793 A1 | 10/2016 | Levy-Abegnoli et al. |
| 2017/0048200 A1 | 2/2017 | Chastain |
| 2017/0116097 A1 | 4/2017 | Keremane et al. |
| 2017/0116526 A1 | 4/2017 | Salam |
| 2017/0171298 A1 | 6/2017 | Jambur Sathyanarayana |
| 2017/0187640 A1 | 6/2017 | Vasudevan et al. |
| 2017/0222831 A1 | 8/2017 | Zirkler |
| 2017/0284839 A1 | 10/2017 | Ojala |
| 2017/0322815 A1 | 11/2017 | Buswell |
| 2017/0359366 A1 | 12/2017 | Bushey et al. |
| 2018/0019948 A1 | 1/2018 | Patwardhan et al. |
| 2018/0024537 A1 | 1/2018 | Chauvet et al. |
| 2018/0063020 A1 | 3/2018 | Bhagavatula et al. |
| 2018/0068134 A1 | 3/2018 | Schwarz |
| 2018/0115457 A1 | 4/2018 | Bonomi et al. |
| 2018/0115519 A1 | 4/2018 | Bonomi et al. |
| 2018/0237040 A1 | 8/2018 | Mong et al. |
| 2018/0302330 A1 | 10/2018 | Bush |
| 2018/0316729 A1 | 11/2018 | Chauvet et al. |
| 2018/0321256 A1* | 11/2018 | Plescia ................ G01N 33/574 |
| 2018/0321356 A1 | 11/2018 | Kulkarni et al. |
| 2018/0374188 A1 | 12/2018 | Lv et al. |
| 2019/0044894 A1 | 2/2019 | Bonomi et al. |
| 2019/0109728 A1 | 4/2019 | Steiner et al. |
| 2019/0116241 A1 | 4/2019 | Bonomi et al. |

FOREIGN PATENT DOCUMENTS

| | | |
|---|---|---|
| GB | 2521376 A | 6/2015 |
| JP | 2009282914 A | 12/2009 |
| WO | WO2016018332 A1 | 2/2016 |
| WO | WO2017132320 A1 | 8/2017 |
| WO | WO2017165701 A1 | 9/2017 |
| WO | WO2018044737 A1 | 3/2018 |
| WO | WO2018075546 A1 | 4/2018 |

OTHER PUBLICATIONS

"International Search Report" and "Written Opinion of the International Searching Authority," Patent Cooperation Treaty Application No. PCT/US2017/048751, dated Nov. 6, 2017, 9 pages.

"International Search Report" and "Written Opinion of the International Searching Authority," Patent Cooperation Treaty Application No. PCT/US2017/057027, dated Feb. 14, 2018, 13 pages.

Bonomi et al., "Fog computing: A platform for Internet of things and analytics," In: Big Data and Internet of Things: A Roadmap for Smart Environments [online], Mar. 12, 2014, Retrieved from the Internet: <URL:https://pdfs.semanticscholar.org/5fe4/c23964c165f42b4e0cd98bf686d04501e628.pdf>, 22 pages.

Ginter, Andrew, "An IT Perspective of Control Systems Security," Industrial Defender [online], Oct. 2009, Retrieved from the Internet: <URL:https://www.controlglobal.com/assets/Media/ Whitepapers/2010/100223_IndustrialDefender_ControlSystemSecurity.pdf>, 9 pages.

Szefer, Jakub et al., "Eliminating the hypervisor attack surface for a more secure cloud," Researchgate [online], Oct. 21, 2011, Retrieved from the Internet: <URL:https://www.cs.princeton.edu/~jrex/papers/ccs11.pdf>, 12 pages.

Palekar, Ashwin, "Network Isolation Options for Machines in Windows Azure Virtual Networks," [online], Mar. 28, 2014, Retrieved from the Internet: <URL:https://azure.microsoft.com/en-us/blog/network-isolation-options-for-machines-in-windows-azure-virtual-networks/>, 65 pages.

"International Search Report and Written Opinion", Patent Cooperation Treaty Application No. PCT/US2017/015045, dated Apr. 26, 2017, 15 pages.

Holloway, Talor, "IBM PowerHA 7.1 heartbeat over SAN," Jan. 21, 2013, https://www.ibm.com/developerworks/aix/library/auaix-powerha-heartbeatlindex. Html.

Singh, Suman Kumar, Loderup, Morten, Noman, Farrukh, "Building High-Availabiltiy Clusters," Oct. 2004, http://www.dell.com/down loads/g lobal/power/ps4q04-20040 151 -sing h .pdf.

Cisco, "Cisco Nexus 7000 Series Supervisor Module;" 1992, http://www.floralimited.com/Files/Products/CISCO/BrochureUrl/Cisco_7000_Supervisor Module(2).pdf.

Rajabali, Taha, "How to Increase System Availabiity without Redundancy;" Dec. 8,2013, https://web.archive.org/web/20131208193132/https://www.bastiansolutions.com/blog/index.php/2013/04/19/how-to-increasesystem-availability-without-redundancy/#.Wp1x3TN96n8.

VMWare, "How VMware HA Works;" Feb. 15, 2016, https://web.archive.org/web/20160215231257/https://pubs.vmware.com/vsphere-4-esxvcenter/index.jsp?topic=/com.vmware.vsphere.availability.doc 41/cusehaworks.html.

"Extended European Search Report," European Patent Application No. 17771191.8, dated Sep. 27, 2019, 8 pages.

(56) References Cited

OTHER PUBLICATIONS

Cisco, "Fog Computing and the Internet of Things: Extend the Cloud to Where the Things Are," [online] Jan. 1,. 2015, Retrieved from the Internet: <URL:https://www.cisco.com/c,/damien_us/solutions/trends/iot/docs/computing-overview.pdf> [retrieved on Sep. 18, 2019], 6 pages.

"OPC Unified Architecture," Wikipedia, Mar. 1, 2016, Retrieved from the Internet: <URL:https://en.wikipedia.org/w/index.php?title=OPC_Unified_Architecture&oldid=707648208> [retrieved on Sep. 18, 2019], 7 pages.

"Office Action," Japanese Patent Application No. 2019-500751, dated Oct. 29, 2019, 11 pages. [23 pages including translation].

Ohnishi et. al., "A Study of Architecture for Control System in Connection with Cloud Server," Technical Report of IEICE, Japan, The Institute of Electronics, Information and Communication Engineers (IEICE), vol. 115, No. 219, Sep. 3, 2015, pp. 11-14.

Takahiro Mitsui, "Toshiba M2M Cloud's Approach Which Performs Appropriate Control according to Product Status," T-Soul, vol. 13, Toshiba Solutions Corporation, Jan. 31, 2015, pp. 6-7.

\* cited by examiner

FOG COMPUTING FACILITATED FLEXIBLE FACTORY

CROSS REFERENCE TO RELATED APPLICATION

This application claims the benefit and priority of U.S. Provisional Application Ser. No. 62/313,640, filed on Mar. 25, 2016, titled "Fog Computing Facilitated Flexible Factory" which is hereby incorporated by reference in entirety, including all references and appendices cited therein.

FIELD OF INVENTION

The present disclosure is directed to fog computing.

SUMMARY

According to some exemplary embodiments, the present disclosure is directed to a method comprising establishing a physical production process as part of a first work cell, establishing a sensing process as part of the first work cell for the physical production process, and establishing a first fog node as part of the first work cell for the physical production and sensing processes. Exemplary methods include establishing a monitoring process for the sensing process and the physical production process, and establishing a second fog node for the monitoring process. Other exemplary methods include establishing a managing process for the monitoring process, the sensing process and the physical production process, and establishing a third fog node for the managing process. Further exemplary methods include establishing a planning process for the managing process, the monitoring process, the sensing process and the physical production process, and establishing a fourth fog node for the planning process. Establishing a first master fog node communicatively coupled to the first, second, third and fourth fog nodes and collectively forming a first computing cluster is also included along with establishing an operating system on the first, second, third, fourth and first master fog nodes, the operating system consistent across all of the fog nodes. Yet even further exemplary methods include the first, second, third, fourth and first master fog nodes each sharing processing responsibilities for the physical production, sensing, monitoring, managing and planning processes and the first master fog node communicatively coupled to a second master fog node, the second master fog node being a member of a second computing cluster.

Other exemplary methods comprise establishing a physical production process as part of a work cell, establishing a sensing process as part of the work cell for the physical production process, establishing a monitoring process for the sensing process and the physical production process, establishing a managing process for the monitoring process, the sensing process and the physical production process, establishing a planning process for the managing process, the monitoring process, the sensing process and the physical production process, and establishing a fog node as part of the work cell for all of the processes.

Also provided herein is an exemplary system comprising a fog federation further comprising a work cell fog node, a plant controller fog node communicatively coupled to the work cell fog node, a manufacturing execution fog node communicatively coupled to the plant controller fog node and the work cell fog node, and a master fog node communicatively coupled to the manufacturing execution fog node, the plant controller fog node and the work cell fog node.

DESCRIPTION OF THE DRAWINGS

Certain embodiments of the present technology are illustrated by the accompanying figures. It will be understood that the figures are not necessarily to scale. It will be understood that the technology is not necessarily limited to the particular embodiments illustrated herein.

DETAILED DESCRIPTION

The Fog Computing Facilitated Flexible Factory is a novel approach for manufacturing a variety of components and products that share a common trait, and/or a novel approach for enabling flexibility and efficiency in services performed in a factory like painting, welding, packaging, bottling, assembling etc. The mechanism uses fog computing nodes as edge device controllers as well as edge devices to perform the required control, communications, analytics and data processing at the factory site to achieve the flexible factory.

The principal characteristic of the Fog Computing Facilitated Flexible Factory is to reduce or eliminate the downtime of a factory element like equipment, a manufacturing cell, a shop floor or a plant triggered by factors that are outside the boundary or influence of the affected factory element. The underlying goal of the flexible factory concept is to maximize productivity, minimize cost and increase revenue. A factory element that would in ideal conditions produce components and products around the clock, may idle due to the unavailability of raw materials or tools, failures or congestion in upstream production lines and other certain short term scenarios measured in terms of, seconds, minutes, hours or days. The factory element may also idle for a longer term, e.g., a few weeks to a month, due to factory line reworking or lack of orders due to low demand. In this sense, the fast adaptability of a manufacturing plant to new products, with shortened set-up times, is a goal of the flexible factory.

Fog computing facilitates management and control of industrial devices like robots, computer numeric controlled ("CNC") machines, manufacturing machines, sensors, actuators, power management devices, air handlers, coolant circulating pumps and other devices, which are collectively called operational technology ("OT") devices, which are present in industrial floors, power plants, oil and gas rigs, high end data centers and other sectors.

The management of these OT devices requires computer servers, network connectivity and associated network equipment, storage devices and associated software, which are collectively called informational technology ("IT") infrastructure.

The following are some of the key objectives and goals of the Fog Computing Facilitated Flexible Factory:

1. Support both manufacturing and service-oriented factories.
2. Agile Manufacturing/Services: provide a method and apparatus for a factory to change the production or service work flow within a factory, change the programmable logic controller ("PLC") programs (ladder diagrams), change the logistics of material handling flow (raw materials, scrap and produced product), change the tooling and other needed functions as soon as possible and go into production or service enablement.
3. Improve overall production capacity: enable a modern factory to support a multi-dimensional business logic and logistics that accepts different types of work orders with priorities, a site to site automatic work ordering process without any human intervention, a mechanism to constantly reevaluate the priorities and change the complete production/service cycle to optimize the overall productivity.
4. Supply chain optimization: provide a mechanism and apparatus to monitor the raw material inventory levels and to track raw material orders required for the current production or service cycle and switch to a different work order in a flexible way.
5. Asset utilization optimization: enable the ability of a factory to change the current work (product or service) based on the availability and localization of tools and skilled operators.
6. Asset Management: enable condition monitoring of different factory elements like machines, cells, plants and zones for failures, and predict failures and detect anomalies.
7. Enable asset/device data collection, data stream definition by defining data signals that contribute to a data stream, data ownership definition through cryptography and role based access control ("RBAC") functions and transport such streams to function end points that compute business decisions based on business logic.
8. Reroute workflow around an impacted cell and reprogram the cells to take additional functions performed by the impacted cell.
9. Deploy Automated Guided Vehicles ("AGVs") equipped with robots for performing the work of an impacted cell.
10. Change the work and material flow to circumvent an impacted cell.
11. Reprogram the complete factory to form a production cycle without using the affected factory element.
12. Enable safe transport in work cells, plants and zones and use that information to achieve the functions listed above.
13. Enable effective resource (machinery operating power, HVAC, water, coolants, etc.) utilization through monitoring and running optimization cycles.
14. Enable a flexible factory that takes requirements from many different clients with many different requirements for the services provided. For example, a painting factory can provide services for a wider range of products with different levels in quality of finish.
15. Enable a flexible factory in which materials, tools and finished product storage, handling and movement is minimized to achieve higher levels of optimization.
16. Improve control and performance: enable faster and more sophisticated manufacturing process control through a converged control architecture, based on fog computing and deterministic networking (based on time-sensitive networking, "TSN"), together with an extended set of sensor measurements, also using more pervasive wireless connectivity.
17. Faster setup of manufacturing processes: enable by more flexible control, resource allocation and more modern programming and software updating, and machine learning.

These and other advantages of the present disclosure are described in greater detail below with reference to the collective drawings FIGS. 1-3.

Figure 1:
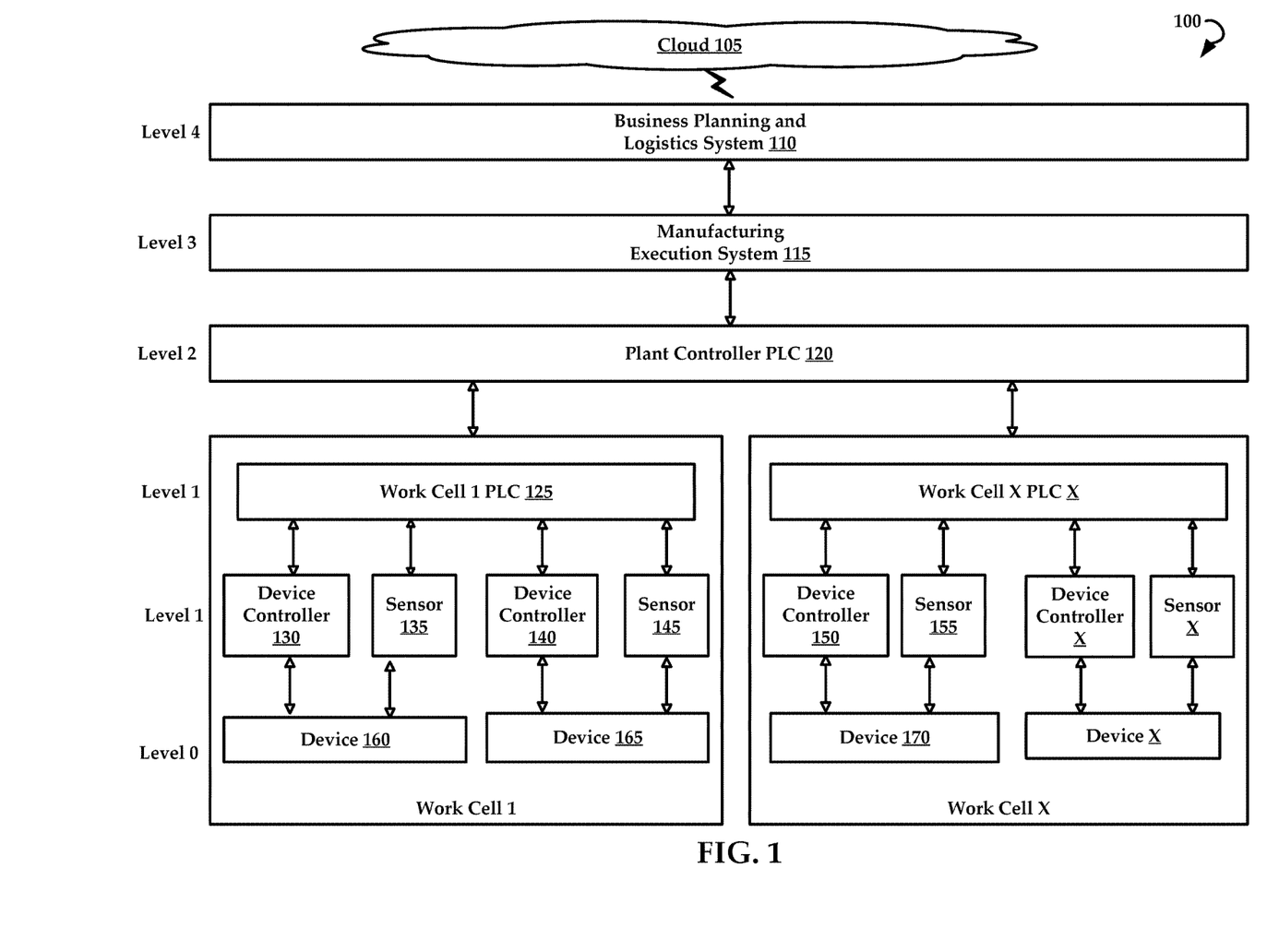
FIG. 1 is a diagram of an exemplary current manufacturing factory.

FIG. 1 is a diagram of an exemplary current manufacturing factory.

The exemplary current manufacturing factory 100 includes cloud 105, business planning and logistics system 110, manufacturing execution system ("MES") 115, plant controller PLC 120, work cell 1 PLC 125, work cell X PLC X, device controller 130, sensor 135, device controller 140, sensor 145, device controller 150, sensor 155, device controller X, sensor X, device 160, device 165, device 170, and device X. Also shown are Levels 0-4. The exemplary current manufacturing factory 100 includes Work Cells 1 through X, where "X" in the figures indicates the possibility for numerous elements of the particular illustrated element.

Hardware components found in a current manufacturing factory such as the exemplary current manufacturing factory 100 include:

Manufacturing execution systems, usually hosted in a server.

Programmable logic controllers (cell, transport, plant and coordinator), based on a microcontroller computing architecture.

Industrial personal computers ("PCs"), hosting various control functions, such as cell control.

Robotic systems.

Industrial arms.

Automatic guided vehicles ("AGVs").

Vision systems, used for quality control, safety, and as flexible sensors.

Other sensors and actuators.

Industrial networking switches.

Information technology equipment (servers, IT switches, firewalls, load balancers).

Software components found in a current manufacturing factory such as the exemplary current manufacturing factory 100 include:

Manufacturing execution system software.

Product definition object models and the manager software.

Programmable logic controller and industrial programmable controller ("IPC") control software, such as ladder diagrams.

Software generating and managing the different key performance indicators ("KPIs") and quality performance indicators ("QPIs") relevant to the manufacturing system.

A manufacturing or service factory is organized into multiple functional levels. Important factory elements at each level interact with layers above and below, performing certain well-defined functions that are in addition to the main workflow. These interactions are specified in the ANSI/ISA 95.01, ANSI/ISA 95.02, ANSI/ISA 95.03 and ANSI/ISA 95.05 specifications.

The above specifications provide models for:

Information exchanged between the manufacturing control and indication system with the business logistics system.

The activities taking place and the information exchanged within the manufacturing control and indication system.

Referring again to FIG. 1, in general:

Level 0 defines the actual physical processes.

Level 1 defines the activities involved in sensing and manipulating the physical processes. This may include intelligent devices for vision and flow.

Level 2 defines the activities of monitoring and controlling the physical processes. This may include control systems such as a programmable logic controller ("PLC"), a distributed control system ("DCS"), and/or an office communication server ("OCS").

Levels 1 and 2 may be considered as manufacturing control, including basic control, supervisory control, process sensing and process manipulation.

A function is in the manufacturing and control domain if:
1. The function is critical to product quality.
2. The function is critical to plant safety.
3. The function is critical to plant reliability.
4. The function is critical to plant efficiency.
5. The function is critical to maintaining product or production regulatory compliance. This includes such factors as compliance with current good manufacturing practice ("cGMP") standards, Federal Drug Administration ("FDA") regulations, Environmental Protection Agency ("EPA") regulations, United States Department of Agriculture ("USDA") regulations, Occupational Safety and Health Administration ("OSHA") regulations, etc.

Level 3 defines the activities of the work flow to produce the desired end-product(s). Level 3 may be considered as manufacturing operations management, including dispatching production, detailed production scheduling and reliability assurance. The typical time frame is in terms of shifts, hours, minutes, and/or seconds. Applications may include manufacturing operations systems such as MES, Batch, and/or laboratory information management systems ("LIMS").

Level 4 defines the business-related activities needed to manage a manufacturing organization. Level 4 may be considered as business planning and logistics including plant production scheduling and business management. The typical time frame is in terms of months, weeks, days and/or shifts. This may include business logistics systems such as enterprise resource planning ("ERP").

A wide disparity in the time frames of Levels 3 and 4 often leads to a sub-optimal factory. Moreover, a larger set-up time required by Level 4 should not result into idle time in Level 3. Similarly, delays in decisions at Level 3 should not stop or delay activities at Level 4.

Information exchanged between Levels 3 and 4 include:
1. Resource Definitions: personnel, equipment and materials.
2. Production Capacity: determining what is available to use.
3. Product Definition: how to make a product.
4. Production Schedule: what to make and use.
5. Production Performance: what was made and used.

There are other non-manufacturing business-related activities that may be in Levels 1 through 4 (or in higher levels), for example security activities, but these are not defined in this standard.

The problems of the exemplary current manufacturing factory 100 include:
1. Integration of business logistics systems to manufacturing systems is difficult and expensive. Integration projects typically take one or more years with a low success rate. Additionally, there is an increasing use of ERP and the corresponding need for integration. The reasons for such problems include different terminology and technical languages, different computer systems and different organizational cultures.
2. Effective operation of manufacturing is difficult to explain and compare. It is difficult to compare operations at different plants and determine best practices. It is difficult to explain end user requirements to vendors, and it is also difficult for vendors to explain solutions to end users. Additionally, MES solutions tend to be too industry specific.
3. Integration of manufacturing operations systems is difficult and expensive.
4. The factory infrastructure is composed of a wide range of hardware components from a wide range of manufacturers that require manual software upgrades, and include manual procedures for system re-configuration that are time consuming, and with broadly different programming environments. Software at each level in the hierarchy is in general developed by a different community, often associated to each different product vendor (e.g., KUKA Robots, Rockwell PLCs, GE MES, etc.). In other words, the infrastructure is characterized by inflexible, dated, resource-limited, hardware components and dated, non-interoperating, manually handled software. For example, a robot controller for one robot is not taking advantage of information collected by the quality control cameras, and is usually not communicating well with other robots in the same cell, nor is naturally elevating its potentially near failure state towards the ERP level. Similarly, the controls of tools and robots supporting those tools are run on separate machines, with little interaction.

In particular, the networking component of the factory infrastructure is composed of a wide range of hardware and software components, which is expensive, difficult to manage, often not secure, and static. It cannot easily be adapted to the needs of manufacturing applications.

5. The key performance indicators ("KPI") of the manufacturing/service level are not available at the decision-making component ("ERP"). The faults and failures of the different hardware components are not propagated to the decision-making component.

6. Safe transport schedules and situations are not made use of in optimizing factory performance. The current system and interfaces are not capable of interoperating with external systems that could influence the manufacturing process and production efficiency. For example, it is difficult to react to short-term events like transportation delays and long-term events like natural disasters etc. Additionally, the location and movement information for key assets and people operating the equipment on the floor are not available at key control and management decision points.

Because of the many architectural inefficiencies as mentioned above, real time behaviors can only be achieved by using deeply local, fully dedicated, embedded processors, connected to sensors and actuators via dedicated, often non-standard networks (e.g., EtherCAT).

The architectural inefficiencies also make the execution of manufacturing processes limited in the speed of operation, thus reducing production capacity. Because of the difficulty in injection of rich and valuable sensor data from wirelessly connected sensors (e.g., positioning tags, etc.) as well as wireless communications to AGVs, the control procedures that may be implementable in today's plants are limited in their input data richness, and thus in their efficiency.

The limitation and positioning of computing resources and the control procedures that may be implementable in today's plants are limited in their sophistication (e.g., no deep analytics or machine learning can be applied within a tight control loop), and thus in their efficiency.

Because of the limitation and positioning of computing resources, together with the rigid and not easily adapted and optimized allocation and interoperation of production tasks, the efficient and organic composition of smaller tasks into larger aggregate tasks that may be implementable in today's plants are limited in their sophistication (e.g., composition of many faster, smaller tasks, building into a larger, aggregate task), and thus in their efficiency.

Critical, real-time information between successive cells, or even stages of manufacturing, is required to travel up the levels, sometimes to Level 4, before it becomes available in the next stage, thus limiting the potentially achievable overall process efficiency. The current systems take several months to a year or more to achieve the desired higher efficiencies for reducing the manufacturing cost. This is due to the current manufacturing methodology in which the characteristics are measured in segmented islands and analyzed offline. Therefore, the current systems are not capable of self-tuning as it involves lots of human intervention and are not end-to-end automated. A flexible factory must be able to overcome this inefficiency and enable self-tuning mechanisms.

Figure 2:
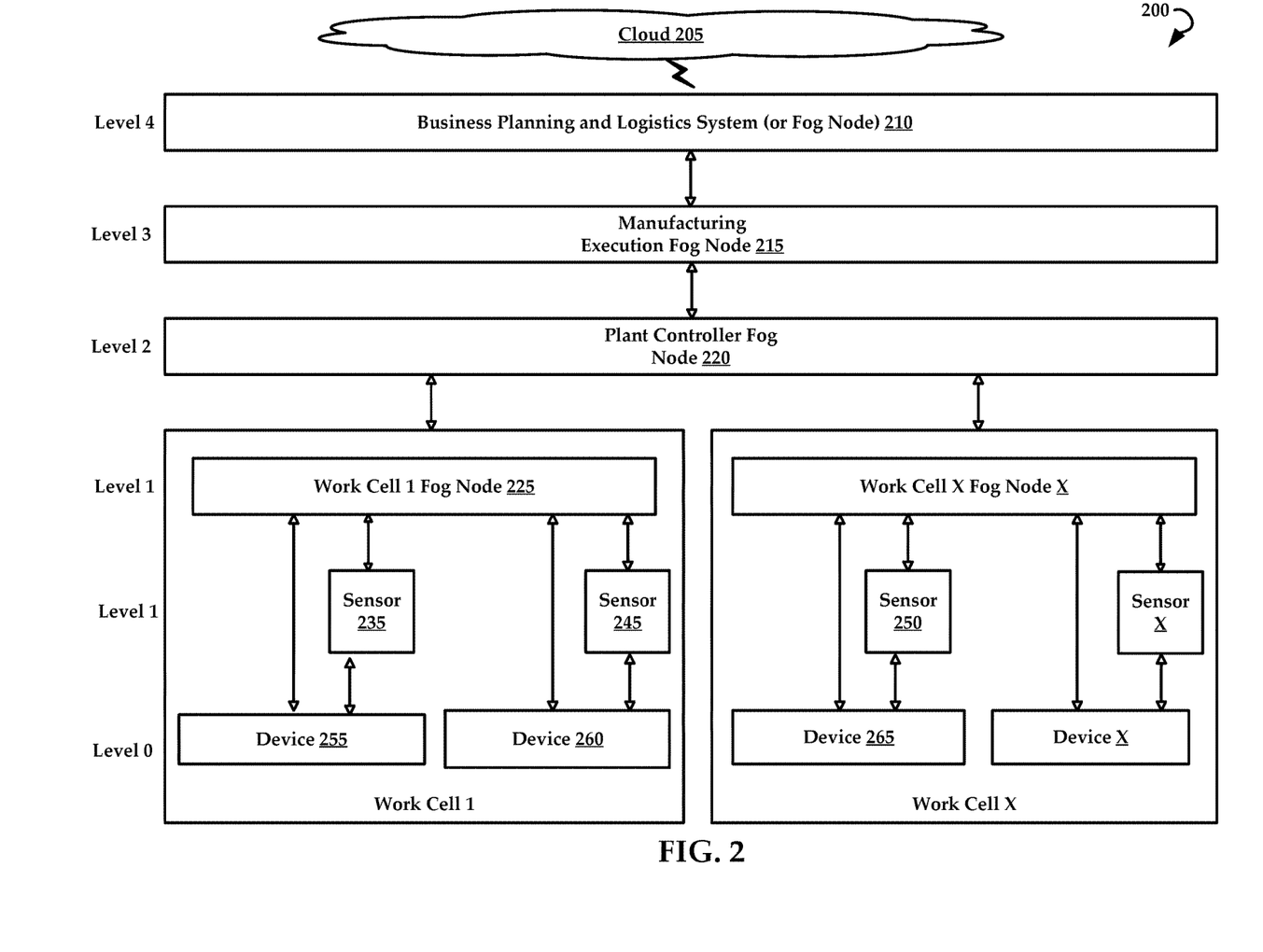
FIG. 2 is a diagram of an exemplary Fog Computing Facilitated Flexible Factory.

FIG. 2 is a diagram of an exemplary Fog Computing Facilitated Flexible Factory.

Shown in FIG. 2 are cloud 205, business planning and logistics system 210, which optionally may be in a fog node, manufacturing execution fog node 215, plant controller fog node 220, work cell 1 fog node 225, work cell X fog node X, sensor 235, sensor 245, sensor 250, sensor X, device 255, device 260, device 265 and device X. The exemplary Fog Computing Facilitated Flexible Factory 200 includes Work Cells 1 through X, where "X" in the figures indicates the possibility for numerous elements of the particular illustrated element. Although multiple fog nodes are shown, in some embodiments, the functions of all of the illustrated fog nodes may be merged into a single fog node.

An exemplary fog node is shown and described in Appendix 1.

Fog nodes replace key hardware components at level 1 to level 3 (and, in some cases, Level 4) and provide integrated software defined networking ("SDN") support, interoperable software, edge analytics, standard deterministic networking and converged control that enables a flexible factory for manufacturing and services.

According to exemplary embodiments, multiple fog nodes may be distributed along the manufacturing path (e.g., one per cell) and may create an interoperating, peer to peer, fast information exchanging fog federation.

Exemplary fog nodes comprise compute, storage, integrated, modern deterministic networking functions and rich I/O interfaces that enable control and indication, and provide the higher level functions that are required at the different levels of the factory shop floor.

At Level 0, according to various exemplary embodiments, a fog node in its smallest single board form factor is integrated with factory floor robots and machines, initially for monitoring and data collection and in later stages for controlling the robots and machines.

At Level 1 and Level 2, fog nodes provide the hardware with flexible hardware and software components for enabling a variety of functions. These functions include monitoring, asset management, virtual PLC functions with hard real time bounds using its time-sensitive networking ("TSN"), real time and non-real time application hosting, anomaly detection, and predictive maintenance software, etc. Fog nodes with their real time enabled, industry standard object linking and embedding ("OLE") for process control/OLE for process control-unified architecture ("OPC/OPC-UA") middleware, enable real time data interoperation. This provides the necessary infrastructure for enabling flexible factories of the future. Fog nodes can host strong analytical capabilities, which may be applied to achieve more sophisticated Level 1 and Level 2 functionality.

At Level 3, according to exemplary embodiments, the fog nodes provide a versatile compute, storage and the necessary infrastructure like TSN to enable MES-like functions to be implemented in software. Fog nodes can host strong analytical capabilities, which may be applied to achieve more sophisticated Level 1 and Level 3 functionality.

According to some exemplary embodiments, at Level 4, fog nodes may host moderate enterprise resource planning/material requirements planning ("ERP/MRP") functionality, within a consistent environment as Levels 0-3.

The software infrastructure running on the fog nodes, according to various exemplary embodiments, enables several functions required for future flexible factories. The fundamental requirement for a flexible factory is agility in the complete life cycle of product manufacturing or service enablement. The software components influence the product manufacturing life cycle as follows:

1. Enabling platform as a service (PaaS) and infrastructure as a service (IaaS) as required for agile redefinition of the product model and the manufacturing steps.
2. Providing zero touch hitless software upgrades in a live manufacturing system (e.g., plant, floor and/or cell) for efficiently deploying new product definitions and manufacturing processes.
3. Platform high availability for down time reduction.
4. Virtualizing the controllers via soft PLCs by using the TSN networking and hard real time operating systems and thereby providing the same level of accuracy and precision in cycle times as that of traditional hardware based PLC systems.

The immediate benefit of virtualized controllers is to change manufacturing process cycles in a few minutes through software upgrades, a process that would otherwise take several days or weeks in the traditional hardware based approach.

In addition, software based controllers eliminate the human errors involved in wiring the hardware based PLCs.

The software provides the necessary mechanism and infrastructure for converging multiple control siloes into a common converged control platform to make enable coordinated, collaborative and centralized decisions. Additionally, a converged platform increases data interoperability, reduces data movements across the network, and accelerates control cycles.

Fog nodes, according to some exemplary embodiments, host rich analytics capabilities, which can be used within a sophisticated control loop. Streaming analytics, in particular, may be used within very tight, time sensitive control loops.

Exemplary embodiments as disclosed herein provide system state monitoring that includes the monitoring of:

1. The production machines and their drives states;
2. The different robotic systems and their drive states;
3. The tools used in actual manufacturing and material handling;
4. The operating conditions of the machines and tools (e.g., vibrations, temperature, etc.);
5. The power consumption of the different system elements;
6. The states of the different actuators, conveyors etc.; and
7. The quality of the finished manufactured product.

System state monitoring additionally enables condition monitoring of the production process. Condition monitoring in turn enables detection of abnormal behaviors and failures in system elements and prediction of impending failures and deviations from the required quality control measures.

The detection of failures, abnormal conditions and other events, triggers operations optimization algorithms to change the product manufacturing life cycle and/or to work around failures or potential failures.

Data normalization and uniform standards based on data modeling (OPC-UA) and a publish/subscribe data bus results in:

1. Different system components to interoperating with each other.
2. Computation of optimal manufacturing work flows.
3. Convergence of control through bringing the distributed system data to one top level for analysis and decision-making.
4. Providing infrastructure for integration of external triggers (e.g., asset location information and other sensory information) that influences the manufacturing workflow (inventory status, raw material ordering and tracking, finished product orders, etc.).

Figure 3:
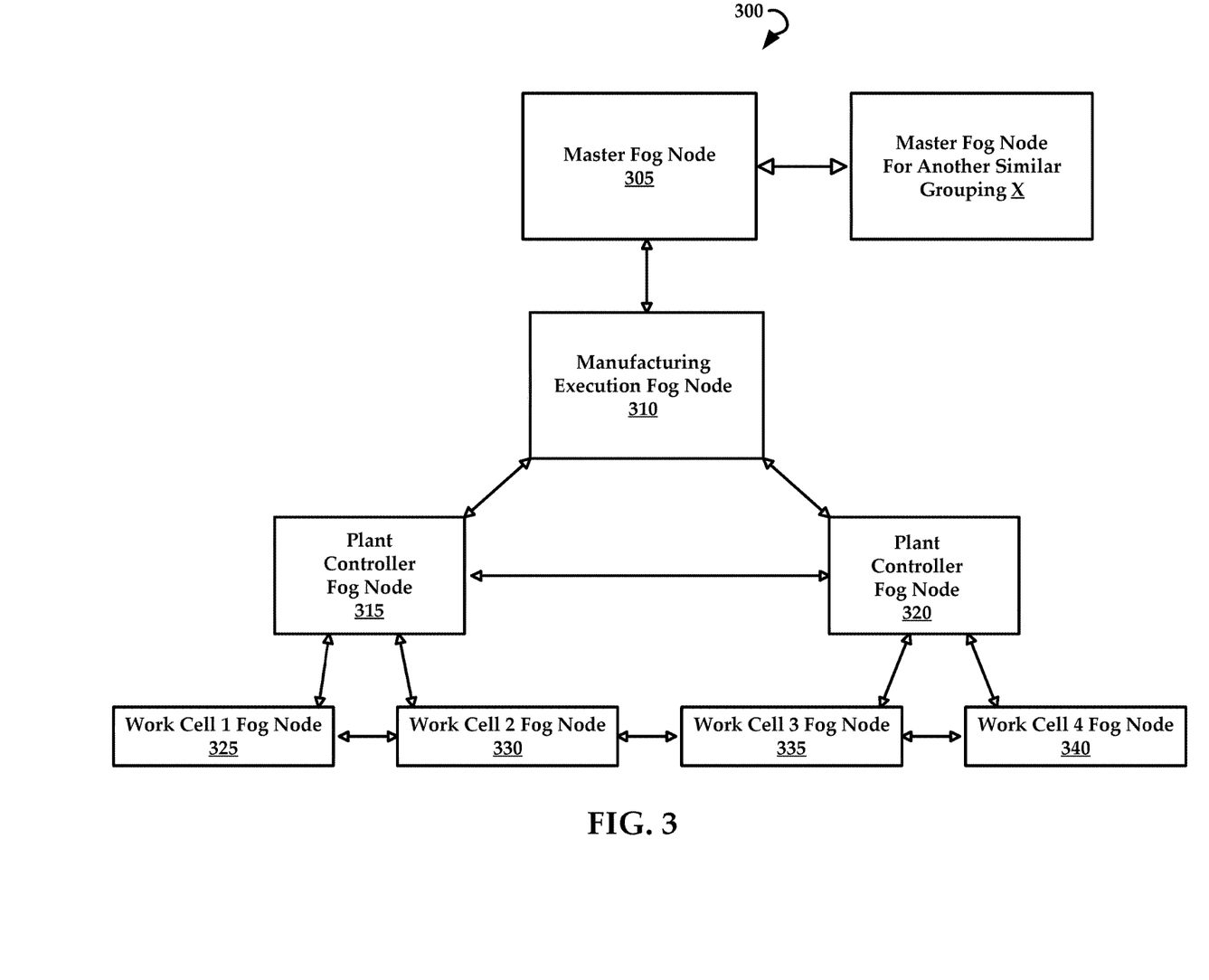
FIG. 3 is a diagram of an exemplary Fog Federation.

FIG. 3 is a diagram of an exemplary Fog Federation.

Shown in FIG. 3 is Fog Federation 300, which includes master fog node 305, manufacturing execution fog node 310, plant controller fog node 315, plant controller fog node 320, work cell 1 fog node 325, work cell 2 fog node 330, work cell 3 fog node 335 and work cell 4 fog node 340.

According to various exemplary embodiments, a plurality of networked fog nodes, known as a Fog Federation, enable the real time movement of data, status, events, and applications along the manufacturing path, for fast and efficient manufacturing processes.

Referring to FIG. 3, work cell fog nodes 325 through 340 are associated with work cells 1-4, respectively. Each work cell may represent a step in a manufacturing process, as illustrated and described in connection with FIG. 2. In the exemplary Fog Federation 300, each work cell fog node may communicate with the other work cell fog nodes for various reasons, including for the coordinated hand-off and synchronization of the manufacturing operation. Additionally, should one work cell fog node have extra capacity or be idle, it may assist another work cell fog node that is not idle or be operating at or near full capacity.

Also shown in FIG. 3 are plant controller fog node 315 and plant controller fog node 320. In some various exemplary embodiments, these nodes may form a single node with manufacturing execution fog node 310. Plant controller fog nodes 315 and 320 may also support each other in the same fashion as the work cell fog nodes, with communication, load balancing and coordinated manufacturing operations. Additionally, plant controller fog nodes 315 and 320 may also perform any of the operations of any of the work cell fog nodes or the manufacturing execution fog node 310, as all the fog nodes in a federation, such as exemplary fog federation 300, comprise a homogenous computing system capable of quickly operating, communicating, assisting and/or filling in for any of the other fog nodes. Additionally, in some exemplary embodiments, various pieces of software for certain operations (e.g. painting) may be transferred or replicated between fog nodes.

According to various exemplary embodiments, master fog node 305 is a "hub" fog node for fog federation 300, which comprises manufacturing execution fog node 310, plant controller fog nodes 315 and 320, and work cell fog nodes 325 through 340. Master fog node 305 may operate in a fashion similar to that described herein with a master fog node for another federation, as this architecture may be repeated numerous times throughout an entire organization.

As illustrated and described in connection with the exemplary fog federation 300, the system comprises a flexible hardware architecture manifesting in a family of fog nodes. Each fog node may perform the following the functionalities of:

1. A ERP/MRP system;
2. Manufacturing execution system;
3. Cell controller;
4. Micro-controller;
5. Industrial personal computer;
4. Robotics controller and visualization;
5. PLC system; and
6. Machine vision and bar code readers.

The rich software stack on each node enables fast, secure solution deployment. Additionally, the exemplary fog federation 300 is an advanced distributed system of networking and computing assets, software and applications, which is end to end managed.

Figure 4:
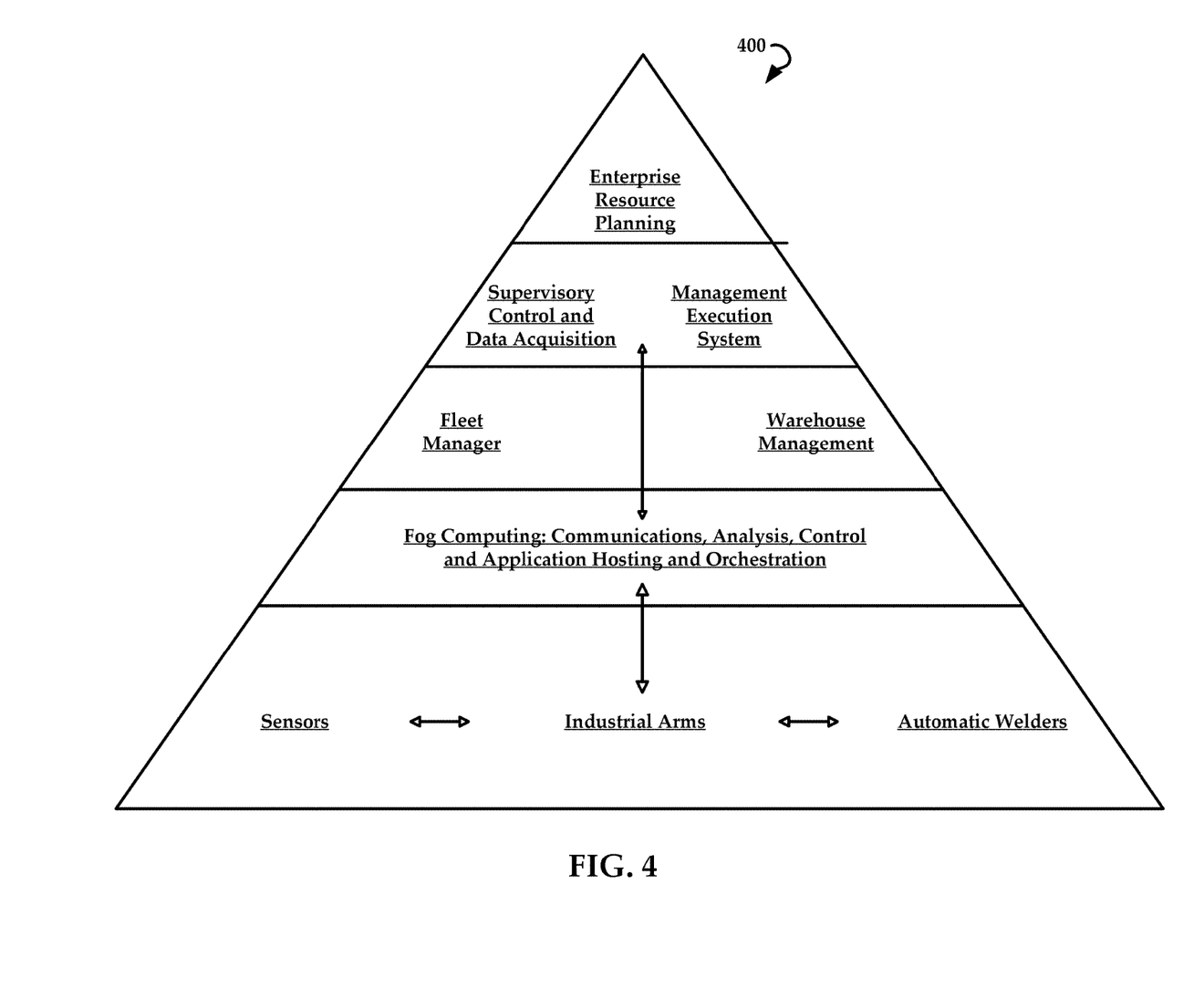
FIG. 4 is a diagram of an exemplary pyramid showing fog computing as a new functional layer in the industrial pyramid.

FIG. 4 is a diagram of an exemplary pyramid showing fog computing as a new functional layer in the industrial pyramid.

As shown in pyramid 400, there is a convergence of information technology and operational technology toward fog computing, thus flattening the pyramid. Also as illustrated, sensors (e.g. vision, temperature, etc.) and devices (e.g. welders, industrial arms, etc.) may communicate with each other for coordinated, efficient production and decision making on the spot. One of the many benefits of fog computing is localizing the computing closer to the production or service line, where computing power is optimized, versus the traditional method of computing in isolated silos ending in a cloud. Accordingly, sensors and devices may communicate with each other and make adjustments in a production or service process instantly (e.g. adjusting welding temperature if a vision sensor spots a weak spot in the weld).

Fog computing also results in tremendous cost savings and increased computing efficiency through elimination of numerous and distinct controllers associated with each device and/or sensor. The redundancy of the fog nodes increases flexibility and efficiency, such as when a factory needs to be updated or when a work cell changes. As shown in FIG. 4, supervisory control and data acquisition, and the management execution system are closely integrated with the operational technology. Additionally, fleet management may at all times be aware of the status of all of the devices and sensors.

Figure 5:
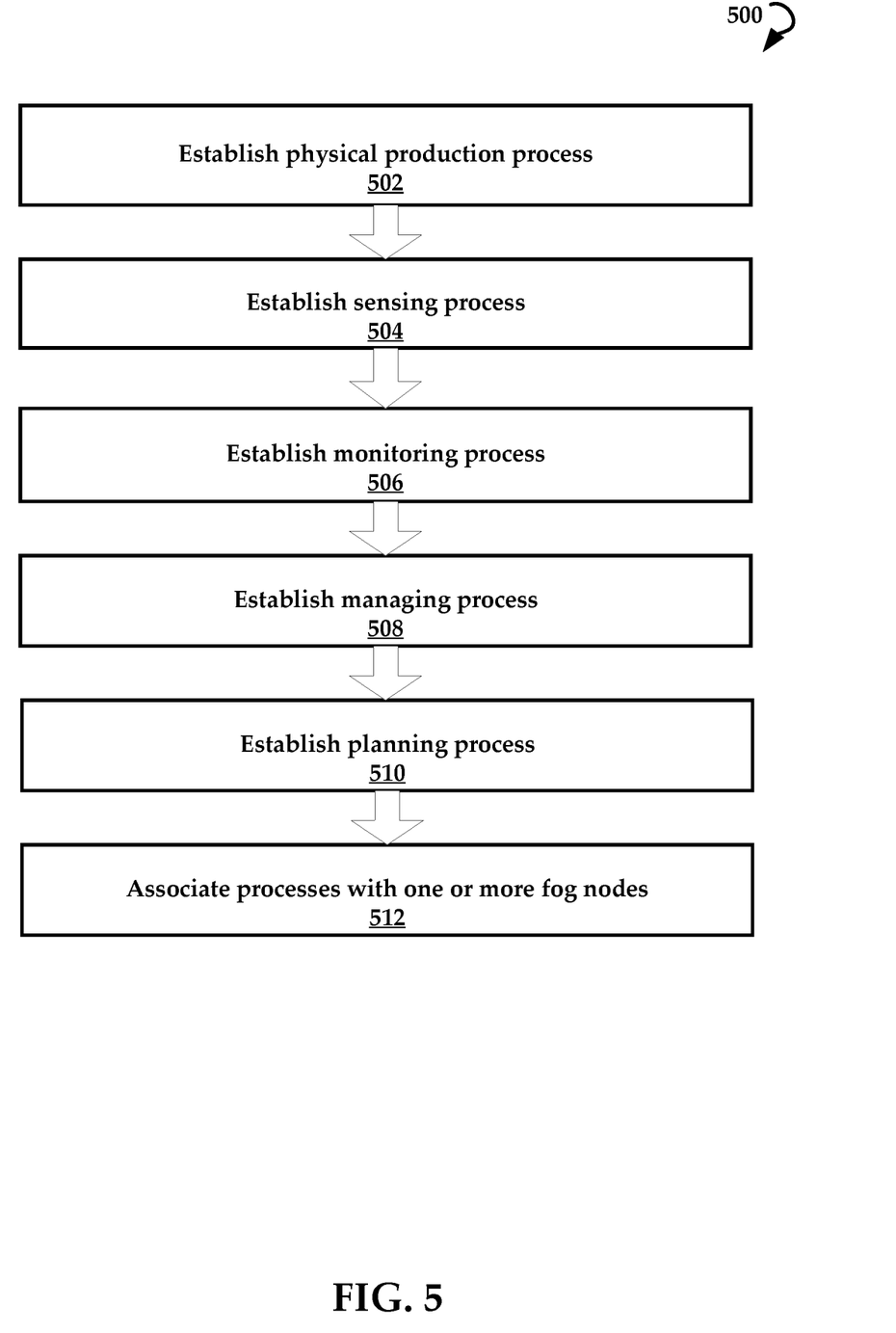
FIG. 5 shows an exemplary method of establishing a fog factory.

FIG. 5 shows an exemplary method of establishing a fog factory.

According to exemplary method 500, at step 502, a physical production process is established. Such a process may be part of a work cell on a factory floor and include a robotic arm, welding device, drilling device, painting device, riveting device, industrial arm, automatic guided vehicle or soldering device or combinations thereof.

At step 504, a sensing process is established. Such a process may be part of a work cell on a factory floor and include vision sensors (e.g. cameras), temperature sensors, meters, etc.

At step 506, a monitoring process is established.
At step 508, a managing process is established.
At step 510, a planning process is established.
At step 512, one or more of the above processes are associated with a fog node. In some exemplary embodiments, the physical production and sensing processes are controlled by a single fog node. Additionally, the monitoring and managing processes may be controlled by a separate fog node for each process or the same fog node for both processes. In yet further exemplary embodiments, a single fog node may control the planning process, or no fog node may be used. In yet even further exemplary embodiments, a single fog node may control all of steps 502-510.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the present technology in the form disclosed. Many modifications and variations will be apparent to those of ordinary skill in the art without departing from the scope and spirit of the present technology. Exemplary embodiments were chosen and described in order to best explain the principles of the present technology and its practical application, and to enable others of ordinary skill in the art to understand the present technology for various embodiments with various modifications as are suited to the particular use contemplated.

Aspects of the present technology are described above with reference to flowchart illustrations and/or block diagrams of methods, apparatus (systems) and computer program products according to embodiments of the present technology. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present technology. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

Also, some embodiments may be described in terms of "means for" performing a task or set of tasks. It will be understood that a "means for" may be expressed herein in terms of a structure, such as a processor, a memory, an I/O device such as a camera, or combinations thereof. Alternatively, the "means for" may include an algorithm that is descriptive of a function or method step, while in yet other embodiments the "means for" is expressed in terms of a mathematical formula, prose, or as a flow chart or signal diagram.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

If any disclosures are incorporated herein by reference and such incorporated disclosures conflict in part and/or in whole with the present disclosure, then to the extent of conflict, and/or broader disclosure, and/or broader definition of terms, the present disclosure controls. If such incorporated disclosures conflict in part and/or in whole with one another, then to the extent of conflict, the later-dated disclosure controls.

The terminology used herein can imply direct or indirect, full or partial, temporary or permanent, immediate or delayed, synchronous or asynchronous, action or inaction. For example, when an element is referred to as being "on," "connected" or "coupled" to another element, then the element can be directly on, connected or coupled to the other element and/or intervening elements may be present, including indirect and/or direct variants. In contrast, when an element is referred to as being "directly connected" or "directly coupled" to another element, there are no intervening elements present. The description herein is illustrative and not restrictive. Many variations of the technology will become apparent to those of skill in the art upon review of this disclosure.

While various embodiments have been described above, it should be understood that they have been presented by way of example only, and not limitation. The descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art. Thus, the breadth and scope of a preferred embodiment should not be limited by any of the above-described exemplary embodiments.

What is claimed is:

1. A method comprising:
   establishing a physical production process as part of a first work cell;
   establishing a sensing process as part of the first work cell for the physical production process;
   establishing a first fog node as part of the first work cell for the physical production and sensing processes;
   establishing a monitoring process for the sensing process and the physical production process;
   establishing a second fog node for the monitoring process;
   establishing a managing process for the monitoring process, the sensing process and the physical production process;
   establishing a third fog node for the managing process;
   establishing a planning process for the managing process, the monitoring process, the sensing process and the physical production process;
   establishing a fourth fog node for the planning process;
   establishing a first master fog node communicatively coupled to the first, second, third and fourth fog nodes and collectively forming a first computing cluster;
   establishing an operating system on the first, second, third, fourth and first master fog nodes, the operating system consistent across all of the fog nodes;
   enabling a federation of interoperable elements across the physical production, sensing, monitoring, planning and managing processes through integration of industry standard OPC/UA protocol providing a fog federation OPC/UA information model that models a flexible factory and provides a OPC/UA aggregation information model (AIM) for the flexible factory;
   the first, second, third, fourth and first master fog nodes each sharing processing responsibilities for the physical production, sensing, monitoring, managing and planning processes;
   the first master fog node communicatively coupled to a second master fog node, the second master fog node being a member of a second computing cluster;
   the second master fog node as part of the second computing cluster performing processing responsibilities for the physical production process and sensing process of the first work cell and one or more of the fog nodes virtualized to support other virtual machines having one or more containers.

2. The method of claim 1, wherein the second computing cluster includes:
   a physical production process as part of a second work cell;
   a sensing process as part of the second work cell for the physical production process; and
   a fog node as part of the second work cell for the physical production and sensing processes.

3. The method of claim 1, further comprising the physical production process being performed by any of a robotic arm, welding device, drilling device, painting device, riveting device, industrial arm, automatic guided vehicle or soldering device or combination thereof.

4. The method of claim 1, further comprising the sensing process being performed by any of a camera, actuator, thermometer, vision sensor, probe or other sensor or combination thereof.

5. The method of claim 1, further comprising the first fog node communicating to the physical production process via a deterministic ethernet network or TSN wireless (WiFi+ BLE) network.

6. The method of claim 1, further comprising the first fog node communicating secure data streams to the monitoring, planning and production process with distinct data ownership that enables secure computation of business decisions based on current sensitive business strategy.

7. A method comprising:
   establishing a physical production process as part of a work cell;
   establishing a sensing process as part of the work cell for the physical production process;
   establishing a monitoring process for the sensing process and the physical production process;
   establishing a managing process for the monitoring process, the sensing process and the physical production process;
   establishing a planning process for the managing process, the monitoring process, the sensing process and the physical production process; and
   establishing a fog node as part of the work cell for all of the processes.

8. A fog federation comprising:
   a work cell fog node;
   a plant controller fog node communicatively coupled to the work cell fog node;
   a manufacturing execution fog node communicatively coupled to the plant controller fog node and the work cell fog node; and
   a master fog node communicatively coupled to the manufacturing execution fog node, the plant controller fog node and the work cell fog node.

9. The fog federation of claim 8, further comprising the plant controller fog node performing any of the operations of the work cell fog node, and the manufacturing execution fog node, and all of the fog nodes transferring or replicating software between each other.

10. The fog federation of claim 9, further comprising the master fog node performing as the manufacturing execution fog node, the plant controller fog node and the work cell fog node.

11. The fog federation of claim 10, further comprising the master fog node performing as the manufacturing execution fog node, the plant controller fog node and the work cell fog node for at least a plurality of other fog federations.

12. The fog federation of claim 11, further comprising each fog node having a flexible architecture and performing functions including that of: an ERP/MRP system, a manufacturing execution system, a cell controller, a microcontroller, an industrial personal computer, a robotics controller with visualization, a PLC system and a machine vision system with a bar code reader.

13. The fog federation of claim 12, further comprising virtualizing each of the controllers to change manufacturing process cycles in a few minutes through software upgrades.

14. The fog federation of claim 13, further comprising centralizing managing of all of the fog nodes in a cloud or locally in a plant.

15. The fog federation of claim 14, further comprising one or more of the fog nodes performing machine learning of information received from a work cell.

* * * * *